US006240790B1

(12) United States Patent
Swedberg et al.

(10) Patent No.: US 6,240,790 B1
(45) Date of Patent: *Jun. 5, 2001

(54) DEVICE FOR HIGH THROUGHOUT SAMPLE PROCESSING, ANALYSIS AND COLLECTION, AND METHODS OF USE THEREOF

(75) Inventors: Sally A Swedberg, Palo Alto; Reid A. Brennen, San Francisco, both of CA (US)

(73) Assignee: Agilent Technologies, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/336,521

(22) Filed: Jun. 18, 1999

Related U.S. Application Data

(60) Provisional application No. 60/107,865, filed on Nov. 9, 1998.

(51) Int. Cl.[7] .......... G01N 1/00

(52) U.S. Cl. .......... 73/863.21

(58) Field of Search .......... 73/863, 863.21, 73/863.23, 863.25, 863.31, 863.33, 864.81, 864.83, 864.85; 422/68.1, 69, 70; 210/601, 602, 451, 452

(56) References Cited

U.S. PATENT DOCUMENTS 5,223,219 * 6/1993 Subramanian et al. .
5,486,335 * 1/1996 Wilding et al. .
5,571,410 11/1996 Swedberg et al. .
5,603,351 2/1997 Cherukuri et al. .......... 137/597
5,658,413 8/1997 Kaltenbach et al. .
5,731,212 * 3/1998 Gavin et al. .
5,928,880 * 7/1999 Wilding et al. .

FOREIGN PATENT DOCUMENTS

3813671A1 4/1988 (DE) .......... B01J/19/00
4206488A1 3/1992 (DE) .......... B01L/11/00
19545130A1 12/1995 (DE) .......... G01N/31/20
19632779A1 8/1996 (DE) .......... G01N/35/00
19648695A1 11/1996 (DE) .......... B01L/3/00
0745856A2 3/1996 (EP) .......... G01N/35/00
0785433A2 5/1996 (EP) .......... G01N/35/00
WO 94/05394 3/1994 (WO) .......... B01D/25/12
WO 96/14934 5/1996 (WO) .......... B01L/3/00
WO 97/32208 9/1997 (WO) .......... G01N/31/10
WO 97/44132 11/1997 (WO) .......... B01L/3/00
WO 97/45718 12/1997 (WO) .......... G01N/21/03
WO 99/19724 4/1999 (WO) .......... G01N/31/10
WO 99/32219 7/1999 (WO) .......... B01J/19/00

* cited by examiner

*Primary Examiner*—Robert Raevis

(57) ABSTRACT

A microanalysis device having a plurality of sample processing compartments is described for use in liquid phase analysis. A microanalysis device system, comprising a plurality of interconnected microanalysis devices. The device is formed by microfabrication of microstructures in novel support substrates. The invention herein can be used for the analysis of small and/or macromolecular and/or other solutes in the liquid phase.

18 Claims, 5 Drawing Sheets

DEVICE FOR HIGH THROUGHOUT SAMPLE PROCESSING, ANALYSIS AND COLLECTION, AND METHODS OF USE THEREOF

CROSS-REFERENCE TO RELATED APPLICATION

This application is related to provisional patent application Ser. No. 60/107,865, filed Nov. 9, 1998, from which priority is claimed under 35 USC § 119(e)(1) and which is incorporated herein by reference in its entirety.

TECHNICAL FIELD

The present invention relates generally to miniaturized liquid phase sample processing and analysis. More particularly, the invention relates to a high-throughput sample processing and analysis device capable of parallel processing and/or analysis of numerous samples.

BACKGROUND OF THE INVENTION

Microanalytical technology, defined as the use of microfabrication processes to create functions in a miniature, continuous format, has recently been recognized as having the potential to revolutionize the way chemical measurements are done. Currently, the focus is on reduction-to-practice of this conceptual technology.

Conceptually, analytical technologies can be categorized into at least two major areas: dynamic or temporal and static or spatial. One means by which the distinction between these two analytical technologies is to consider them in the context of data display. For dynamic or temporal data representation, the data is plotted as time on the abscissa and response on the ordinate. In the case of static or spatial representation, the data is plotted as position versus response.

Generally, samples that can be processed in a manner amenable to static or spacial representation are more amenable to high-throughput than data that must be considered in a dynamic or temporal representation. An example of this concept in the miniaturization technology format, by which the distinction between processing of spacial and temporal data can be illustrated, is the distinction between array technology and capillary electrophoresis (CE) chip technology. Microarray technology, an example of spatial analysis, has been proposed for simultaneous processing of thousands of samples. By contrast, CE chip technology, described, for example, in U.S. Pat. No. 5,658,413 to Kaltenbach et al., processes samples individually and sequentially.

Challenges for microanalysis devices include not only achieving the miniaturization of the analysis device with the concomitant reduction in footprint of attendant hardware, but also imparting greater simplicity to the end user. The concept alternately referred to as "lab-on-a-chip," "microlab" or "micro-total analysis system" has been proposed as a solution to these challenges. In the "lab-on-a-chip" configuration, the objective is to analyze a component or components in a complex matrix. The user delivers an unprocessed sample to the device, actuates the devices and is provided with the desired analysis. All complex sample preparation steps that would otherwise be performed "at-bench" before the sample analysis is performed are done automatically "on-chip" and in continuum with the analysis. An example of this approach has been described in U.S. Pat. No. 5,571,410 to Swedberg et al.

To date, the various examples of an integrated lab-on-a-chip have been sequential, single throughput devices. It is the object of this invention to combine the advantages of high throughput with the advantages of fully automated sample-in-sample-out processing. The invention involves integrating a plurality of devices, each device having a plurality of sample chambers that provide specific sample preparation and/or separation/detection function or functions. When integrated, these devices provide a variety of complex functions for many samples in parallel. The devices may be processed separately or they may be integrated at transfer step to provide parallel sample processing.

SUMMARY OF THE INVENTION

Accordingly, it is a primary object of the invention to provide a microanalysis device that is capable of parallel sample processing and analysis.

It is another object of the invention to provide a microanalysis device system comprising a plurality of microanalysis devices.

In one embodiment a microanalysis device is provided comprising a substrate having (a) first and second substantially planar opposing surfaces; and (b) a plurality of parallel sample processing compartments comprising (i) an intra-microanalysis device sample treatment component, (ii) an inlet port in fluid communication with the sample treatment component and (iii) an outlet port in fluid communication with the sample treatment component.

It is yet another object of the invention to provide a microanalysis device system comprising first and second interconnected microanalysis devices wherein each microanalysis device comprises a substrate having (a) first and second substantially planar opposing surfaces and (b) a sample processing compartment which comprises (i) an intra-microanalysis device sample treatment component, (ii) an inlet port in fluid communication with the sample treatment component and (iii) an outlet port in fluid communication with the sample treatment component, wherein the outlet port of the first microanalysis device and the inlet port of the second microanalysis device are in fluid communication.

These and other embodiments of the subject invention will readily occur to those of ordinary skill in the art in view of the disclosure herein.

BRIEF DESCRIPTION OF THE FIGURES

FIG. 6A illustrates an example of microanalysis devices comprising co-axially aligned apertures reversibly interconnected by a pin situated therein. FIG. 6B illustrates an example of microanalysis devices comprising two alignment pin apertures in each of first and second microanalysis devices are situated such that the fluidic ports that are to be aligned are centered between the two pin apertures.

DETAILED DESCRIPTION OF THE INVENTION

Figure 1A:
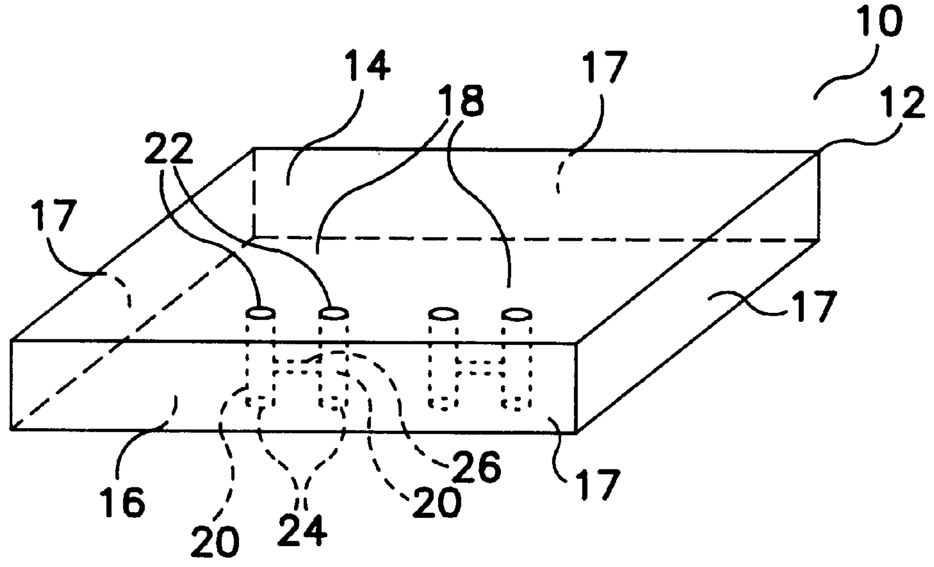
FIG. 1A and FIG. 1B are a perspective view and a cross section, respectively, of an example of a microanalysis device as disclosed herein.

Before the invention is described in detail, it is to be understood that this invention is not limited to the particular component parts of the devices described or process steps of the methods described as such devices and methods may vary. It is also to be understood that the terminology used herein is for purposes of describing particular embodiments only, and is not intended to be limiting. It must be noted that, as used in the specification and the appended claims, the singular forms "a," "an" and "the" include plural referents unless the context clearly dictates otherwise. Thus, for example, reference to "an analyte" includes mixtures of analytes, reference to "a detection means" includes two or more such detection means, reference to "a sample processing compartment" includes more than one such compartment, reference to "a sample treatment component," a "sample flow component" or to an "analytical treatment component" includes more than one such component, and the like.

In this specification and in the claims which follow, reference will be made to a number of terms which shall be defined to have the following meanings:

The term "plurality" as used herein is intended to mean two or more.

"Optional" or "optionally" means that the subsequently described feature or structure may or may not be present in the integrated planar separation device or that the subsequently described event or circumstance may or may not occur, and that the description includes instances where said feature or structure is present and instances where the feature or structure is absent, or instances where the event or circumstance occurs and instances where it does not. For example, the phrase "a microanalysis device optionally having detection means" intends that detection means may or may not be present on the device and that the description includes both circumstances where detection means are present and absent.

The term "substrate" as used herein refers to any material that can be microfabricated, e.g., dry etched, wet etched, laser etched, molded or embossed, to have desired miniaturized surface features. In addition, microstructures can be formed on the surface of a substrate by adding material thereto, for example, polymer channels can be formed on the surface of a glass substrate using photo-imageable polyimide. Preferably, the substrate is capable of being microfabricated in such a manner as to form features in, on and/or through the surface of the substrate. The substrate can be a polymer, a ceramic, a glass, a metal, a composite thereof, a laminate thereof, or the like. Elements of the device, including but not limited to top and bottom plates, are comprised of the substrate. Thus, the device may include a plurality of substrate layers.

Microanalysis devices and systems comprising such devices are prepared using suitable substrates as described above. A "composite" is a composition comprised of unlike materials. The composite may be a block composite, e.g., an A-B-A block composite, an A-B-C block composite, or the like. Alternatively, the composite may be a heterogeneous, i.e., in which the materials are distinct or in separate phases, or homogeneous combination of unlike materials. As used herein, the term "composite" is used to include a "laminate" composite. A "laminate" refers to a composite material formed from several different bonded layers of same or different materials. Other preferred composite substrates include polymer laminates, polymer-metal laminates, e.g., polymer coated with copper, a ceramic-in-metal or a polymer-in-metal composite.

The term "adhesion" is used herein to mean the physical attraction of the surface of one material for the surface of another. An "adhesive" is a material used to join other materials, usually solids, by means of adhesion. An "adherend" is a material to which an adhesive displays adhesion. The term "adhesive bond" is the assembly made by the joining of adherends by an adhesive.

The term "sample processing compartment" is used herein to refer to a region of the support in which sample handling is carried out. Sample handling includes the entire range of operations capable of being performed on the sample from its introduction into the compartment until its removal for use. Thus, sample processing includes operations that effect sample preparation and/or sample separation. The sample processing compartment frequently will include one or more access ports for introducing materials into, and withdrawing materials from the compartment (e.g., sample, fluids and reagents).

The term "sample flow channel" is used herein to refer to the flow path extending from the first end of the sample processing compartment of the miniaturized separation device to the second end thereof.

The term "sample handling region" refers to a portion of a microchannel, or to a portion of a "sample processing compartment" that is formed upon enclosure of the microchannel by a top plate or bottom plate in which a corresponding features have been microfabricated as described below, that includes a "sample flow component" or a "sample treatment component." By the term "sample flow component" is intended a portion of the sample processing compartment that interconnects sample treatment components.

A "sample treatment component" is a portion of the sample processing compartment in which particular sample preparation processes are performed. Such processes include, but are not limited to, mixing, labeling, filtering, extracting, precipitating; digesting, and the like. Typically, an analyte of interest is obtained in a matrix containing other species which may potentially interfere with the detection and analysis of the analyte. Accordingly, one example of a sample treatment component is a portion of the sample processing compartment in which bulk separation of the analyte from the matrix is effected. Thus, examples of functions which may be served by the sample treatment component include bulk chromatographic separations, bulk electrophoretic separations, bulk electrochromatographic separations, mixing, labeling, filtering, extracting, precipitating, digesting, and the like.

The term "function" used herein to describe the operating characteristic of a sample treatment component is intended to mean that the sample treatment component is used for "bulk separation" or "analytical separation" of a sample in preparation for final analysis and detection. Thus, the "function" of a sample separation chamber can be, generally, liquid or solid phase extraction, filtration, precipitation, derivatization, digestion, or the like. In addition, such functions may include but are not limited to: concentration of a sample from a dilute solution; chemical modifications of sample components; chromatographic and/or electrophoretic separation bulk of analyte components from matrix components; removal of interfering molecules and ions; and the like. When a "function" is said to be performed by an "element" it is intended that the extraction, filtration, precipitation, derivatization or digestion is performed by a medium or material that is intended to perform that function, e.g., the function of digestion can be performed by an element that is a protease. Reference to sample treatment components that perform a predetermined function using the "same element" intends that each component is comprised of the same medium, matrix or material that is intended to perform that function, for example, each sample treatment component that performs the function of digestion comprises the same protease element, e.g., trypsin. Reference to sample treatment components that perform a predetermined function using "different elements" intends that each component is comprised of a different medium, matrix or material each of which is intended to perform that function, for example, each sample treatment component that performs the function of digestion comprises a different protease, e.g., trypsin, pepsin, papain, and the like.

The phrase "bulk separation" is defined herein to mean a sample preparation process that prepares a sample for analytical separation and detection. Typically, a bulk separation process effects an enrichment of the analyte of interest in the sample. "Analytical separation" is defined as the final separation means of analyte from minor components before final analyte detection.

As "detection means" is intended to include any means, structure or configuration that allows the interrogation of a sample within a sample processing compartment using analytical detection means well known in the art. Thus, a detection means includes one or more apertures, elongated apertures or grooves that communicate with the sample processing compartment and allow an external detection apparatus or device to be interfaced with the sample processing compartment to detect an analyte passing through the compartment. "Electrical communication" includes both direct conductive communication and indirect electromagnetic communication in which the sample or separated analytes in a sample processing compartment induce changes in an electromagnetic field and thereby provides means by which the sample or separated analytes can be detected. See, e.g., Fracassi et al. (1998) *Anal. Chem.* 70:4339–4343 for an example of indirect electromagnetic communication.

An "optical detection path" refers to a configuration or arrangement of detection means to form a path whereby radiation, such as a ray of light, is able to travel from an external source to a means for receiving radiation—wherein the radiation traverses the sample processing compartment and can be influenced by the sample or separated analytes in the sample flowing through the sample processing compartment. An optical detection path is generally formed according to the invention by positioning a pair of detection means directly opposite each other relative to the sample processing compartment. In this configuration, analytes passing through the sample processing compartment can be detected via transmission of radiation orthogonal to the major axis of the sample processing compartment (and, accordingly, orthogonal to the direction of electro-osmotic flow in an electrophoretic separation). A variety of external optical detection techniques can be readily interfaced with the sample processing compartment using an optical detection path including, but not limited to, UV/Vis, Near IR, fluorescence, refractive index (RI) and Raman techniques.

Mass spectrometry ("MS") and NMR are detection means well suited to yielding high quality chemical information for multi-component samples, requiring no a priori knowledge of the constituents.

The use of microfabrication techniques such as, but not limited to, bulk etching, surface micromachining, thick film processing, laser ablation, laser etching, molding and embossing, in the practice of the invention allows for a high degree of precision in the alignment of micro-scale components and structures, which alignment has either been difficult or not possible in prior substrate-based devices. Thus, the term "microalignment" as used herein refers to the precise and accurate alignment of microfabricated features, including the enhanced alignment of complementary microchannels or microcompartments with each other, inlet and/or outlet ports with microchannels or separation compartments, detection means with microchannels or separation compartments, detection means with other detection means, an outlet port in a first microanalysis device with an inlet port in a second microanalysis device, and the like.

The term "microalignment means" is defined herein to refer to any means for ensuring the precise microalignment of microfabricated features in a microanalysis device. Microalignment means can be formed in the column devices either by laser ablation or by other methods of fabricating shaped pieces well known in the art. Representative microalignment means that can be employed herein include a plurality of co-axially arranged apertures microfabricated in component parts and/or a plurality of corresponding features in column device substrates, e.g., projections and mating depressions, grooves and mating ridges or the like. Alternative alignment means includes features forms in component parts such as pin and mating aperture. Further, the accurate microalignment of component parts can be effected by forming the microanalysis devices in flexible substrates having at least one fold means microfabricated therein, such that sections of the substrate can be folded to overlie other sections thereby forming composite micro-scale compartments, aligning features such as apertures or detection means with separation compartments, or forming micro-scale separation compartments from microchannels. Such fold means can be embodied by a row of spaced-apart perforations fabricated in a particular substrate, a contiguous slot-like depression or a series spaced-apart slot-like depressions or apertures microfabricated in the substrate so as to extend only part way therethrough, or the like. The perforations or depressions can have circular, diamond, hexagonal or other shapes that promote hinge formation along a predetermined straight line. See, e.g., commonly owned U.S. application Ser. No. 09/100,495, entitled "Integrated Miniaturized Device for Processing and NMR Detection of Liquid Phase Samples," to Freeman et al., filed Jun. 19, 1998.

The term "liquid phase analysis" is used to refer to any analysis which is done on either small and/or macromolecular solutes in the liquid phase. Accordingly, "liquid phase analysis" as used herein includes chromatographic separations, electrophoretic separations, and electrochromatographic separations. These modes of separation are collectively referred to herein as "sample separation means."

In this regard, "chromatographic" processes generally comprise preferential separations of components, and include reverse-phase, hydrophobic interaction, ion exchange, molecular sieve chromatography, affinity chromatography and like methods.

"Electrophoretic" separations refers to the migration of particles or macromolecules having a net electric charge where said migration is influenced by an electric field. Accordingly electrophoretic separations contemplated for use in the invention include separations performed in columns packed with gels (such as polyacrylamide, agarose and combinations thereof) as well as separations performed in solution.

"Electrochromatographic" separations refer to combinations of electrophoretic and chromatographic techniques. Electrochromatographic separations is a hybrid technique typically performed in microcapillary format. Column packing may be either traditional packed column (see, e.g., Knox et al. (1987) *Chromatographia* 24:135) or monolithic packing (see, e.g., Peters et al. (1998) *Anal. Chem.* 70:2288).

The term "motive force" is used to refer to any means for inducing movement of a sample along a column in a liquid phase analysis, and includes application of an electric potential across any portion of the column, application of a pressure differential across any portion of the column or any combination thereof.

The term "surface treatment" is used to refer to preparation or modification of the surface of a substrate that will be in contact with a sample during separation, whereby the separation characteristics of the device are altered or otherwise enhanced. Accordingly, "surface treatment" as used herein includes: physical surface adsorptions; covalent bonding of selected moieties to functional groups on the surface of treated substrates (such as to amine, hydroxyl or carboxylic acid groups on condensation polymers); methods of coating surfaces, including dynamic deactivation of treated surfaces (such as by adding surfactants to media), polymer grafting to the surface of treated substrates (such as polystyrene or divinyl-benzene) and thin-film deposition of materials such as diamond or sapphire to treated substrates.

The microstructures in the miniaturized separation device of the invention, e.g., sample processing compartments, injection means, detection means and micro-alignment means, may be formed by microfabrication in a support body such as a polymeric, ceramic, glass, metal or composite substrate. Polymer materials are particularly preferred and include materials selected from the following classes: polyimide, polycarbonate, polyester, polyamide, polyether, polyolefin, or mixtures thereof.

The phrase "laser etching" is intended to include any surface treatment of a substrate using laser light to remove material from the surface of the substrate. Accordingly, the "laser etching" includes not only laser etching but also laser machining, laser ablation, and the like.

The term "laser ablation" is used to refer to a machining process using a highenergy photon laser such as an excimer laser to ablate features in a suitable substrate. The excimer laser can be, for example, of the $F_2$, ArF, KrCl, KrF, or XeCl type.

The term "injection molding" is used to refer to a process for molding plastic or nonplastic ceramic shapes by injecting a measured quantity of a molten plastic or ceramic substrate into dies (or molds). In one embodiment of the present invention, microanalysis devices may be produced using injection molding.

The term "embossing" is used to refer to a process for forming polymer, metal or ceramic shapes by bringing an embossing die into contact with a pre-existing blank of polymer, metal or ceramic. A controlled force is applied between the embossing die and the pre-existing blank of material such that the pattern and shape determined by the embossing die is pressed into the pre-existing blank of polymer, metal or ceramic. The term "hot embossing" is used to refer to a process for forming polymer, metal, or ceramic shapes by bringing an embossing die into contact with a heated pre-existing blank of polymer, metal, or ceramic. The pre-existing blank of material is heated such that it conforms to the embossing die as a controlled force is applied between the embossing die and the pre-existing blank. The resulting polymer, metal, or ceramic shape is cooled and then removed from the embossing die.

The term "LIGA process" is used to refer to a process for fabricating microstructures having high aspect ratios and increased structural precision using synchrotron radiation lithography, galvanoforming, and plastic molding. In a LIGA process, radiation sensitive plastics are lithographically irradiated at high energy radiation using a synchrotron source to create desired microstructures (such as channels, ports, apertures and micro-alignment means), thereby forming a primary template.

It will be readily apparent to one of ordinary skill in the art that microfabrication techniques may be used to form miniaturized sample processing channels and apertures in a wide variety of geometries. Accordingly, the invention concerns formation of microanalysis devices and microanalysis device systems comprising interconnected microanalysis devices using microfabrication techniques in a suitable substrate. It is also contemplated to form such devices and systems using injection molding, embossing, hot embossing, ablation, etching techniques, and the like.

Microanalysis devices constructed as disclosed herein are useful in any analysis system where analysis is performed on either small and/or macromolecular solutes in the liquid phase and may employ chromatographic and/or electrophoretic separation means. The device comprises microchannels and chambers for sample preparation, separation, analysis and detection. For example, a biological sample such as blood, urine, milk, cell or tissue extract, fermentation product or the like is added directly to the device. The sample is then prepared as required for the particular separation process to be performed, i.e., filtration, solid phase extraction, capillary electrophoresis or liquid chromatography. The prepared sample is then shunted to a separation chamber, and immediately following separation, detected by any of a number of means well known in the art.

In particular, a microanalysis device useful for sample processing can be prepared by microfabricating a channel in the surface of a substrate which, when mated with a mirror image of the substrate in which a corresponding channel has been fabricated, forms, for example, a separation chamber. As noted above, such a device and a method of preparing such a device are disclosed in U.S. Pat. No. 5,658,413 to Kaltenbach et al., supra. The channel can be prepared to have a high-surface area textured surface using the methods disclosed in Brennen et al., supra. The texturing of the surface of the channel can be homogeneous, i.e., uniform throughout the channel, i.e., both across and along the linear axis of the channel. Alternatively, the texturing of the channel can be heterogenous, i.e., the texturing is not uniform across or along the linear axis of the channel or both across and along the linear axis of the channel. The heterogeneity of the texturing may be either continuous, e.g., there can be a continually changing texturing, or discontinuous, e.g., there can be segments of distinct heterogeneous texturing. In addition, the channel surface of the substrate can be prepared to have a mixture of homogeneous and heterogeneous regions or segments as the application of the device requires.

The mode of separation that can be effected using microanalysis devices and systems comprises thereof can be chromatographic separation, electrophoretic separation, and combinations of chromatographic and electrophoretic separation modes. Optionally, these separation modes can be performed using channels having high surface area texturing or a surface treatment, i.e., channels that have a high-surface area surface that is prepared or modified such that the separation characteristics of the device is altered by adsorption, bonding or coated as described above, or otherwise enhanced. Examples of selective chromatographic separation modes include "normal" phase separation, reverse phase separation, hydrophobic interaction separation, ion exchange separation, affinity capture separation, and combinations of these modes. Thus, for example, reverse phase separation may be effected in a separation compartment formed from a channel to which has been bonded, on which has been adsorbed or which has been coated with a $C_{18}$ moiety. Similarly, ion exchange separation may be effected in a separation compartment formed from a channel to which has been bonded, on which has been adsorbed or which has been coated with a member of a series of strong or weak anion or cation exchanger, or a combination of strong and weak anion or cation exchangers. Examples of electrophoretic separation modes include either modes done in an unpacked channel, e.g., capillary zonal electrophoresis ("CZE"), capillary isoelectric focusing ("CIEF"), or micellar electrokinetic capillary chromatography ("MECC"), or in a packed channel having a physically tortuous path, filling the interstitial spaces of a channel having a high-surface area texture with a gel, e.g., a cross-linked or uncrosslinked polymeric composition such as polyacrylamide or agarose which may or may not be bonded to the surface of the channel. For electrochromatography, the interstitial spaces of a channel having a high-surface area texture are packed with a material, e.g., particles, that provide selective separation characteristics.

The invention, together with additional features and advantages thereof, may be best understood by reference to the following description taken in connection with the illustrative drawings.

Figure 1B:
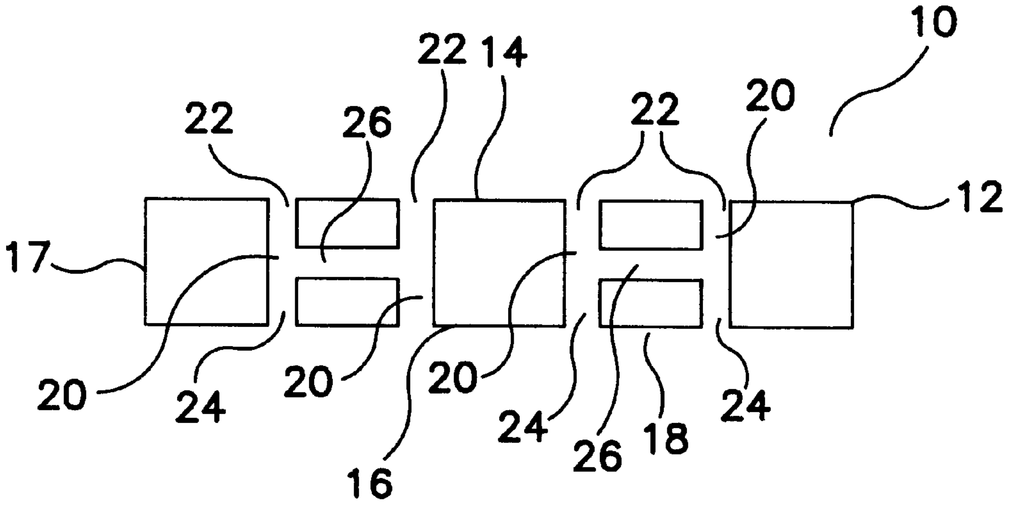

With reference to FIG. 1A and FIG. 1B, a microanalysis device (10) is generally provided. The device comprises a substrate (12) having first (14) and second (16) substantially planar opposing surfaces, and lateral surfaces (17) and a plurality of parallel sample processing compartments (18). In the embodiment illustrated in FIG. 1A and FIG. 1B, both sample processing compartments are identical. However, each of the plurality of sample processing compartments can be the same or different. In addition, any proportion of the sample processing compartments can be the same, e.g., 50%, while the remainder can be the same or different. One of skill in the art will recognize that the device can include any combination of same or different sample processing compartments.

As used herein, the term "parallel" intends that the sample processing compartments are independent and not interconnected. However, the outflow from sample processing compartments, or from sample treatment or flow components thereof, can be routed to an intra-device, inter-device or off-device sample treatment/analysis/detection chamber, or the like. Parallel sample processing compartments are capable of receiving and processing a plurality of samples simultaneously. In this case, the plurality of samples may be multiple copies of the same sample or multiple different samples. Each sample processing compartment comprises an intra-microanalysis device sample treatment component (20), an inlet port (22) for transferring a sample into the sample treatment component, and an outlet port (24) for transferring a sample from the sample treatment component and in fluid communication with the sample treatment component. As illustrated in FIG. 1A and FIG. 1B, the inlet and outlet ports are placed in the first and second opposing surfaces of the substrate. Alternatively, the inlet and outlet ports can be placed on the same surface of the substrate. In addition, the inlet port and/or outlet port can be on the lateral surfaces of the substrate. The inlet port or the outlet port, or both the inlet and outlet ports, may be configured to allow inter-microanalysis device fluid communication.

The sample processing compartment can also comprise an intra-microanalysis device sample flow component (26) or a serial arrangement of intra-microanalysis device sample flow components and intra-microanalysis device sample treatment components. Optionally, the serial arrangement of flow and treatment components can be a serial arrangement of alternating sample flow components and sample treatment components. Each sample treatment component can perform the same or different function. In the case in which each sample treatment component performs the same function the sample treatment component can be comprised of the same or different elements that effect the function.

The inlet port can be configured to receive samples from an "off-device" source, e.g., by operator-assisted or automated injection from a separation or analytical instrument or from an "on-device" source or "inter-device" source. Similarly, the outlet port can be configured to dispense sample to an "off-device," or to an "on-device" or "inter-device" sample receiving means. Examples of "off-device" receiving means include, but are not limited to a microtiter plate, a bibulous sheet means, an analytical array device, a liquid chromatography instrument or a capillary electrophoresis instrument. Examples of "on-device" or "inter-device" receiving means include, but are not limited to, a microanalysis separation device and an "on-device" or "inter-device" microanalysis analytical device with inlet ports configured to receive samples from an "on-device" or "inter-device" source.

Figure 2A:
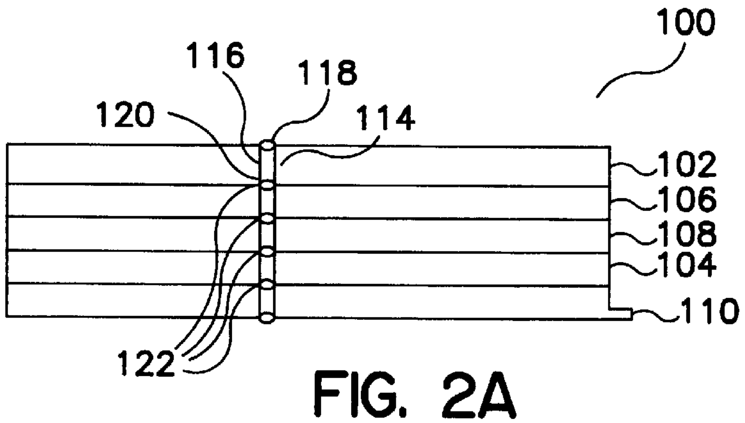
FIGS. 2A and 2B are, respectively, a cross-section and an exploded view of a parallel processing high-throughput microanalysis device system.
Figure 2B:
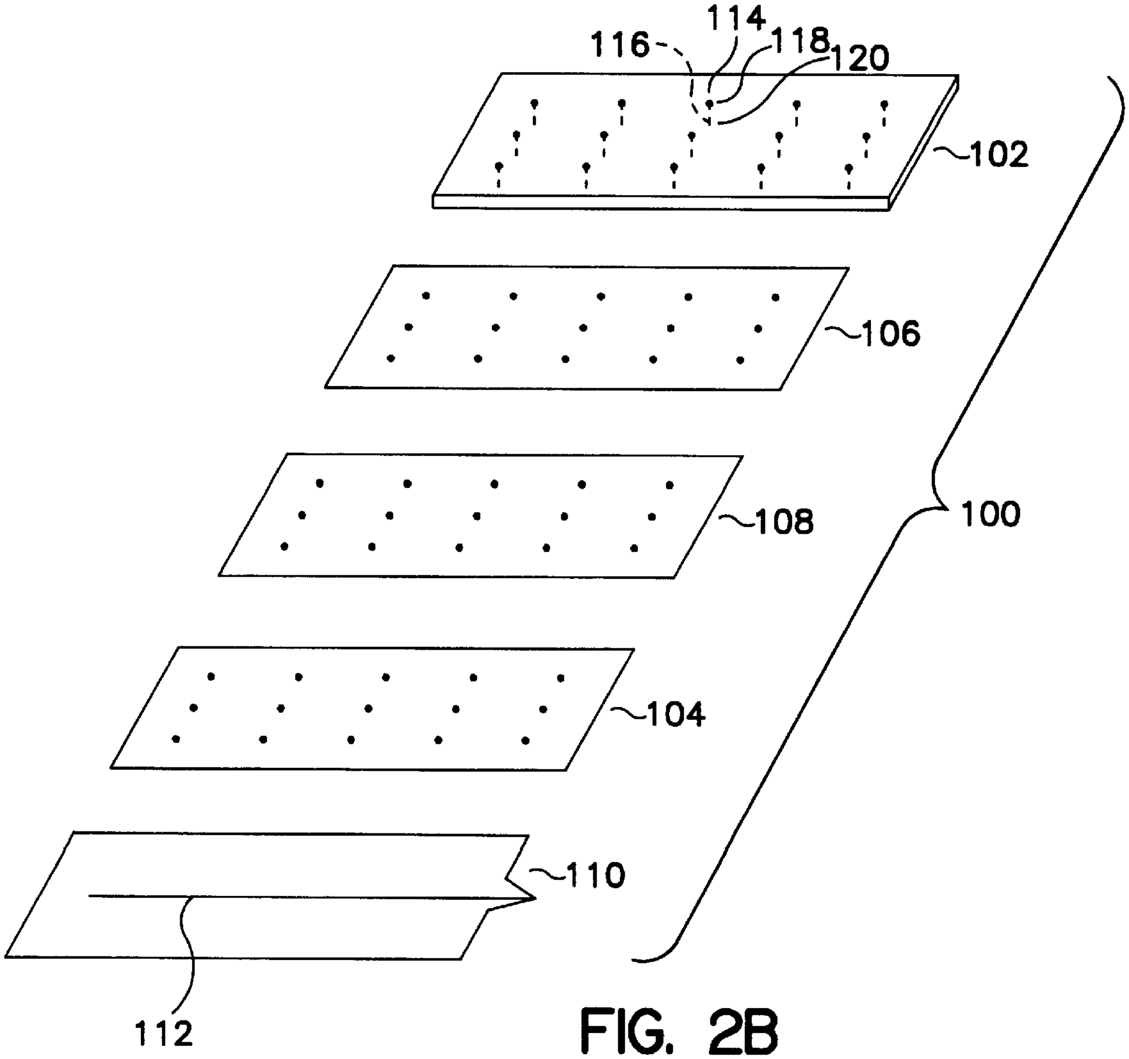

Another embodiment of the invention is illustrated in FIG. 2A and 2B. By contrast, reference is made to U.S. Pat. No. 5,571,410 to Swedberg et al. ("the '410 patent"), which illustrates a miniaturized total analysis system ($\mu$-TAS). $\mu$-TAS comprises a serial arrangement of alternating sample flow components and sample treatment components. The $\mu$-TAS depicted in FIG. 15 of the '410 patent contains a first access port (222) by which sample may be introduced into a first sample flow component (202) that is in fluid communication with a sample treatment component (214) (references made herein are those provided in the '410 patent). Sample flow components (204), (206), (208), (210) and (212) are in an alternating serial arrangement with sample treatment components (214), (216), (218) and (220). Only serial sample processing can be performed using such a $\mu$-TAS. By comparison, FIG. 2A is a cross section of a microanalysis device system in which parallel sample processing may be performed. The microanalysis device system comprises a plurality of microanalysis devices, each of which can be designed to correspond to a sample treatment component of the $\mu$-TAS. FIG. 2B is an exploded view of a microanalysis device system by which the correspondence between each sample treatment component of the $\mu$-TAS and each microanalysis device of the microanalysis device system is illustrated. Thus, in contrast to $\mu$-TAS, in which single sample serial processing is the only mode of operation, the microanalysis device system as disclosed and claimed herein can be configured to conduct multiple sample parallel processing.

The microanalysis device system illustrated generally at (100) in cross section in FIG. 2A and in an exploded view in FIG. 2B comprises a first (102) and second (104) interconnected microanalysis device. Optionally, as illustrated in FIG. 2, the system includes, third (106) and fourth (108), or more, interconnected microanalysis devices and/or a device (110) comprising an analytical treatment component (112), or a plurality thereof.

Each of devices (102), (104), (106) and (108) comprises one or a plurality of parallel sample processing compartments (114), each of which comprises an intra-microanalysis device sample treatment component (116), which may be a bulk treatment component or an analytical treatment component, and an inlet port (118) and an outlet port (120). Each of the sample processing components also comprises an inlet port and an outlet port. The inlet port comprises a means for transferring a sample into the sample treatment component. The outlet port comprises a means for transferring a sample from the sample treatment component. The inlet port of the first microanalysis device (102) of the system comprises a means for transferring a sample into the system from a source external to the system. The outlet port of the first microanalysis device (102) of the system, the inlet and outlet ports of the third (106) and fourth (108) microanalysis devices and the inlet port of the second microanalytical device (104) comprise means for enabling intermicroanalysis device fluid communication (122). In the embodiment illustrated in FIG. 2A and 2B, the second microanalysis device (104) is interconnected to a microanalysis device (110) comprising an analytical treatment component (112). In this configuration of the device, the outlet port of the second microanalysis device is configured to enable inter-microanalysis device fluid communication. Alternatively, the outlet port of the second microanalysis device (104) can be configured to deliver the sample to an off-device sample receiving means, such as, for example, a microtiter plate, a bibulous sheet means, an analytical array device, a liquid chromatography instrument or a capillary electrophoresis instrument. As stated above, the outflow from sample processing compartments, or from sample treatment or flow components thereof, or the bulk outflow from a microanalysis device, can be routed to an intra-device or inter-device mixing chamber, e.g., the microanalysis device system can comprise a microanalysis device the sole function of which is sample mixing.

As described above, each sample processing compartment can also comprise an intra-microanalysis device sample flow compartment or a serial arrangement of intra-microanalysis device sample flow components and intra-microanalysis device sample treatment components. Optionally, the serial arrangement of flow and treatment components can be a serial arrangement of alternating sample flow components and sample treatment components. Each sample treatment component of each microanalysis device that form the system can perform the same or different function. In the case in which each sample treatment component performs the same function the sample treatment component can be comprises of the same or different elements that effect the function.

As described in commonly owned U.S. application Ser. No. 09/100,495, to Freeman et al., supra, ("the '495 application") a microanalysis device or a system of such devices can further include an injection means that allows for the distribution of externally housed liquid samples, buffers, reagents, and makeup flow fluids into the separation compartment Thus, in one configuration, a sample introduction means can comprise a manifold that closely engages the first surface of the microanalysis device and enables the interface of associated conduits and fluid containment means with the inlet port thereof. Such a manifold is illustrated in FIG. 18 and FIG. 19 of the '495 application.

The manifold can be coupled to the first surface of the microanalysis device to form a liquid-tight interface using pressure sealing techniques known in the art. The manifold and microanalysis device can be mechanically associated using clips, tension springs or any suitable clamping means known in the art. The manifold generally includes a plurality of ports that are configured to correspond with the pattern of inlet ports present in the microanalysis device. A first conduit can be used to interface a containment means (not shown) housing a sample to be separated, or a suitable buffer, with the separation channel. The conduit is interposed within a port in the manifold, and arranged to be in fluid communication with the upstream terminus of the sample separation component via the inlet port. In this manner, fluids from the associated containment means can be readily delivered to the separation compartment using known injection methods.

Intermicroanalysis device interconnects comprise an outlet port and an inlet port of adjacent microanalysis devices that are configured to provide inter-microanalysis device fluid communication. Such fluidic interconnects allow attachment between microanalysis devices that provide alignment, allow connections between components fabricated of different types of substrates, allow each device to be detached from the system and replaced or interchanged with another device. See, e.g., Gonzalez et al. (1998) *Sensors and Actuators B* 49:40–45. The fluidic interconnects are preferably zero dead volume structures that are sealed against leaks.

There are two preferred means for enabling intermicroanalysis device fluid communication. A "direct interconnection means" is a fluid interconnect wherein an outlet port of a first microanalysis device is aligned directly to an inlet port of a second, adjacent microanalysis device. A "separate interconnect means" is a fluid interconnect wherein a third fluidic path is interposed between inlet and outlet ports of first and second microanalysis devices.

Except as otherwise noted, the following discussion of intermicroanalysis device fluid interconnect sealing and alignment is related primarily to direct interconnection means.

There are at least two primary considerations for interconnecting microanalysis devices. The first is the sealing of the fluidic connection paths between adjacent planar device components to minimize fluid leakage therefrom and to minimize the dead volume of each connection. The second is the alignment of the inlet and outlet ports of the adjacent microanalysis devices.

Direct Interconnect Sealing Means

The interconnection between the inlet and outlet ports of adjacent microanalysis devices can be divided into several family types: bosses and o-rings, direct/flat adhesive contact, sleeve fittings, and separate interconnects.

Interconnect sealing: bosses and O-rings: Bosses and O-rings are raised surfaces surrounding a central hole or fluid port. For the purpose of this invention, a boss is generally part of the surface in which a fluid port exists. Thus, as illustrated in cross-section in FIG. 3A, first microanalysis device (130) having fluidic port, i.e., an inlet or an outlet port, (134) is interconnected with second microanalysis device (132) having fluidic port (136) by boss (138), which is an integral part of the second microanalysis device. By contrast, an O-ring is usually a separate piece of material, often a ring of compliant material with either a circular, elliptical, rectangular cross-section, or the like. As illustrated in cross-section in FIG. 3B, first microanalysis device (140) having fluidic port (144) is interconnected with second microanalysis device (142) having fluidic port (146) by O-ring (148).

Figure 3A:
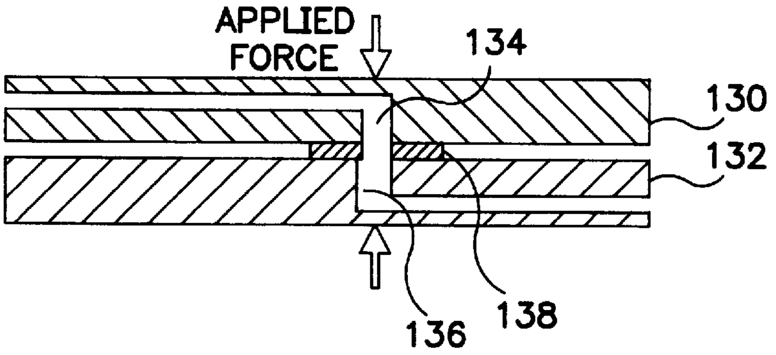
FIG. 3A and FIG. 3B are cross sections of an example of first and second microanalysis devices comprising a boss and an O-ring, respectively, direct interconnections.
Figure 3B:
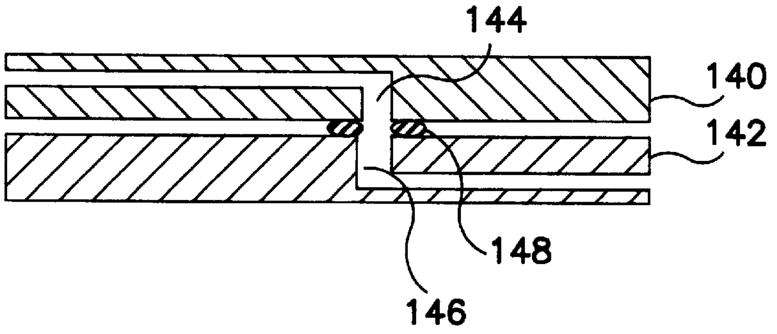

When a fluid port on one microanalysis device is brought into contact with a boss on a second microanalysis device, or when two such devices are mutually in contact with an O-ring interposed therebetween, there is a limited area of contact. The limited area of contact between the two devices reduces the force necessary to seal the connection as the boss or O-ring compresses to conform to the surface surrounding the fluid port in the adjacent planar device. Force is only required to be applied through the points of contact. A boss, an O-ring or both a boss and an O-ring can be used around both of the ports prior to their being brought into contact. For example, a first microanalysis device comprising a fluid port and a boss associated therewith as illustrated in FIG. 3A can be brought into contact with a second microanalysis device comprising a mating fluid port and an O-ring such that the boss and the O-ring contact each other to form a seal.

Interconnect sealing—direct, flat adhesive or targeted force contact: "Direct, planar adhesive contact" as used in reference to the invention disclosed and claimed herein comprises two planar surfaces of adjacent first and second microanalysis devices in contact with one another, wherein an adhesive bond exists therebetween. This bond may be effected through one of several exemplary processes. For example, one process involves the application of an adhesive material to an adherend. Candidate adhesive materials from either the pressure sensitive or structural class adhesive materials can be used. Examples of adhesive materials from the class of pressure sensitive adhesives include those from the group of acrylates, acrylate-epoxy hybrids, natural rubber, and the like. Examples of adhesive materials from the class of structural adhesives includes those from the group of polyimides, acrylates, urethanes, cyanates, and the like. Still another process for effecting an adhesive bond is a welding process mediated by solvents, heat or both solvents and heat. An example os solvent welding is the use of a nonpolar volatile organic solvent to bond polymers from the class of styrenics. An example of thermal bonding is the application of heat to bond polymers from the class of acrylics. Finally, an example of effecting adhesion between polymer surfaces is ultrasonic welding. Ultrasonic welding can be successfully used in a range of classes of polymers including, but not limited to, methacrylates, styrenes, polypropylenes and acrylonitrile-butadienestyrene (ABS) copolymers. While the examples provided above are for polymer adherends, one of skill in the art will recognize that the adherend can be a polymer, a ceramic, a glass, a metal, a composite thereof, a laminate thereof, or the like.

Figure 4A:
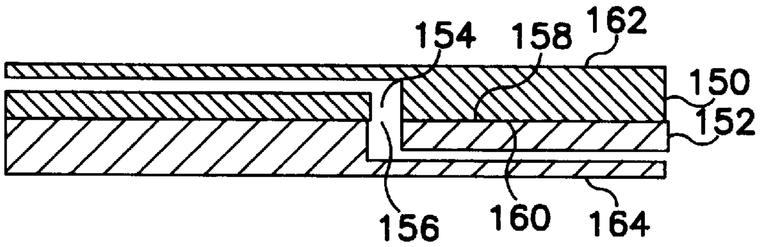
FIGS. 4A and 4B are cross-sections of an example comprising first and second microanalysis devices and a direct flat adhesive contact interconnection.
Figure 4B:
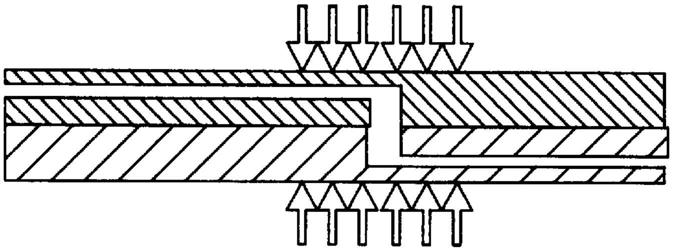

The contact area can encompass the whole plane of each contacting surface of microanalysis devices. Optionally, the contact area can surround aligned fluidic ports in the first and second microanalysis devices. For surfaces that adhere or bond over the whole area of contact, sealing will occur around the fluidic port connection. Thus, as illustrated in FIG. 4, first microanalysis device (150) having fluidic port (154), a first planar surface (158) and a second opposing surface (162), wherein the second opposing surface is, optionally, planar, is brought into contact with second microanalysis device (152) having second fluidic port (156), first flat surface (160) and second opposing surface (164), wherein the second opposing surface is, optionally, planar, in such a manner that the ports are aligned and the first planar surfaces of the first and second microanalysis devices provide a planar adhesive contact. Alternatively, "a targeted applied force" may be applied to the second opposing surface of the first and second microanalysis devices to provide sealing around the fluid port connections. The targeted applied force is applied to the second opposing surfaces in an area circumferential to the fluidic ports located in the first planar surfaces. Targeted applied force may also be used in conjunction with the adhesive method.

Figure 5A:
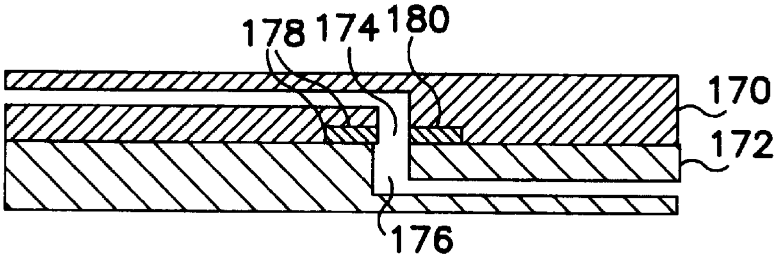
FIG. 5A and FIG. 5B are cross sections of an example of first and second microanalysis devices comprising boss-sleeve and compression projection-sleeve, respectively, direct interconnections.

Interconnect sealing—sleeve fittings: "Sleeve fittings" have at a fluidic port of a first microanalysis device a boss or a compression-type projection that, rather than contacting a flat plane or mating projection, fits inside a mating depression or sleeve at the fluidic port of a second micoanalysis device. Thus, as illustrated in FIG. 5A, first microanalysis device (170) having fluidic port (174) is interconnected with second microanalysis device (172) having fluidic port (176) by boss (180), which is an integral part of the second microanalysis device and which fits into mating sleeve (178). The standard sleeve seal is similar to the boss described above and illustrated in FIGS. 3A and 3B, but the amount of compression that the boss can be subject to is limited by the depth of the receiving sleeve, i.e. the height of the boss can only be compressed to the depth of the sleeve.

Figure 5B:
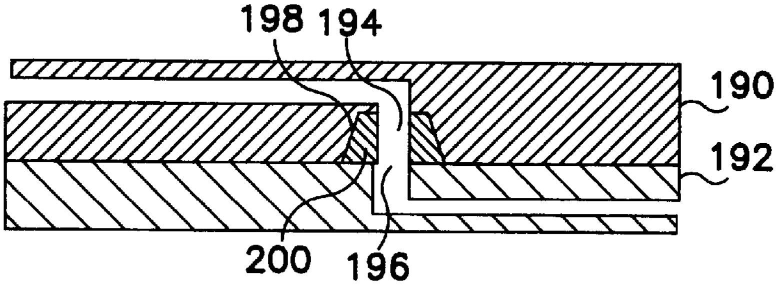

FIG. 5B illustrates first microanalysis device (190) having fluidic port (194) interconnected with second microanalysis device (192) having fluidic port (196) by compression projection (200), which is an integral part of the second microanalysis device and which fits into mating sleeve (198). As illustrated in FIG. 5B, the compression projection is a truncated conical shape and the sleeve is tapered to mate with the projection. This is not intended to limit the configuration of the projection and sleeve in any manner. Thus, the projection and mating sleeve can be, for example, square- or triangular-pyramidal shapes. As illustrated in FIG. 5, the compression projection is a ferrule that, as it is inserted into the mating sleeve, is compressed thereby forming a seal between the tapered sidewall of the compression feature and the sidewall of the receiving indentation. The compression-type sleeve seal does not require contact between the opposing surfaces of the two planar devices being connected.

Interconnect alignment means

Means for aligning fluidic ports of adjacent microanalysis devices for fluid interconnects can be divided into at least three types: separate physical alignment means, "projection-and-mating depression" alignment means, and optical alignment means. These alignment means can be employed to align microanalysis devices before actual operation thereof, e.g., factory assembly, or they can be used to align microanalysis devices during their actual use, e.g., end-user assembly.

Separate physical alignment means: The "separate physical alignment" means employs a distinct, separate component to align the microanalysis devices and their respective inlet and outlet ports.

Figure 6A:
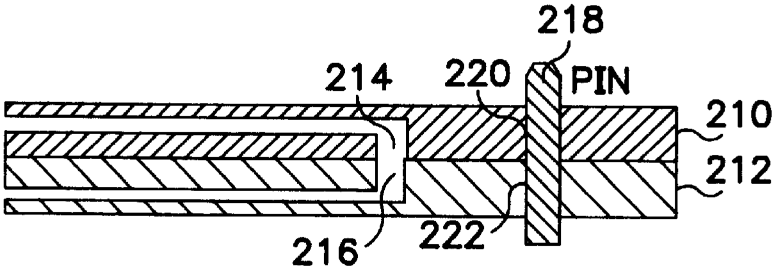
FIG. 6A and FIG. 6B are cross sections of an example of first and second microanalysis devices comprising an on-device alignment means comprising co-axially arranged pins and mating apertures.
Figure 6B:
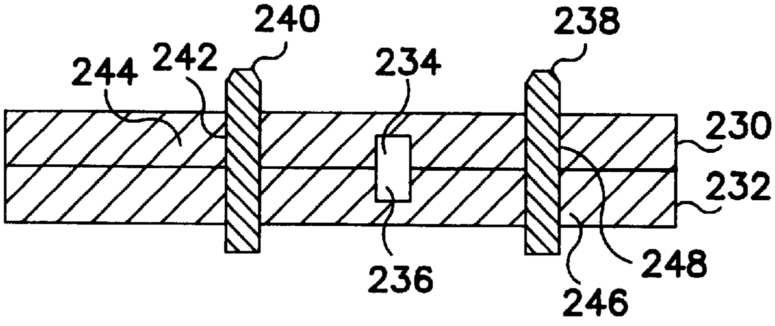

One type of separate physical alignment means is an on-device alignment means comprising co-axially arranged apertures microfabricated in at least one of two adjacent first and second microanalysis devices and corresponding features in the other of the devices, e.g., projections and mating depressions, grooves and mating ridges or the like. One preferred separate physical alignment means comprises features formed in microanalysis devices such as pin and mating aperture. As illustrated in FIG. 6A, first microanalysis device (210) having fluidic port (214) is interconnected with second microanalysis device (212) having fluidic port (216) by pin (218) which is inserted into aperture (220) in the first microanalysis device and aperture (222) in the second microanalysis device. In one alternative embodiment, the pin can be an integral part of the one or both of the microanalysis devices. The pin and the apertures can be circular, square, triangular, or any shape that can be used to effect interconnection between the first and second microanalysis devices. Preferably, the pin is the same dimension or slightly larger than the corresponding aperture to ensure that the pin will be centered in the aperture. The inlet and outlet ports that are to be aligned are situated with respect to the apertures on each microanalysis device such that the ports are aligned when the pins and apertures are aligned. A preferred configuration of the pin-and-aperture separate physical alignment is illustrated in FIG. 6B. First microanalysis device (230) having fluidic port (234) is interconnected with second microanalysis device (232) having fluidic port (236) by pins (238) and (240) which are inserted into apertures (248) and (242), respectively, in the first microanalysis device and apertures (246) and (244) in the second microanalysis device. In this configuration, the two alignment pin apertures in each of first and second microanalysis devices are situated such that the fluidic ports that are to be aligned are centered between the two pin apertures. Alternatively, the features to be aligned may be placed anywhere near the alignment apertures. As in FIG. 6A, the pins can be integral parts of the first, second or first and second microanalysis devices.

Figure 7:
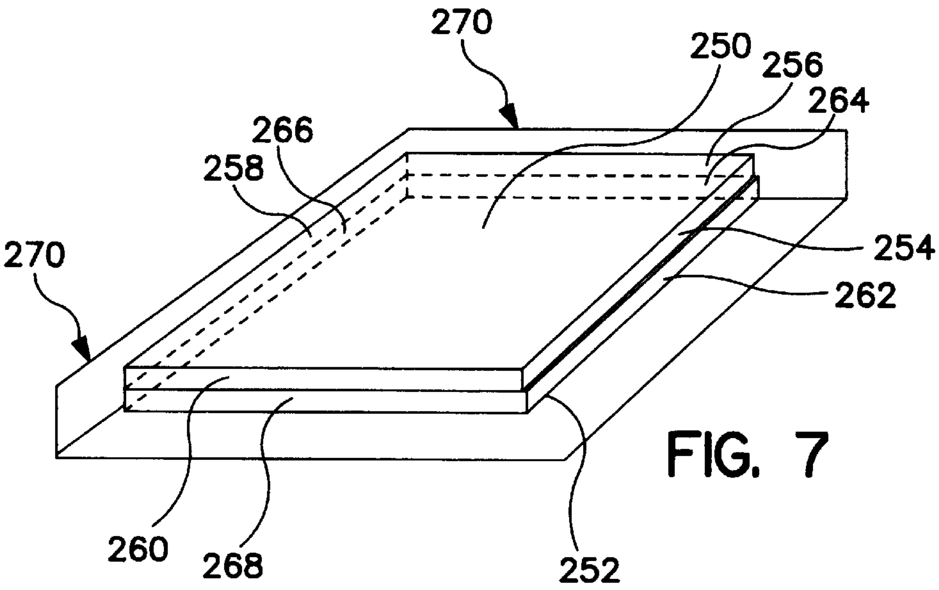
FIG. 7 is a perspective view of a physical alignment means comprising an external alignment means.

A second physical alignment means comprises, rather than an on-device alignment means, an external alignment means. For example, as illustrated in FIG. 7, first (250) and second (252) microanalysis devices have edges (254, 256, 258, 260) and (262, 264, 266, 268), respectively. At least two of the edges of the two devices, as illustrated edge (256 and 258) of first microanalysis device (250) and edges (264 and 266) of second microanalysis device (252) are in contact with external alignment means (270) boundaries such that the microanalysis devicess are aligned to one another.

Projection-and-mating depression alignment means: Projection-and-mating depression alignment means differs from separate physical alignment means in that, rather than a separate component providing the physical alignment, features on the microanalysis devices themselves provide the physical alignment. Examples of projection-and-mating depression means are illustrated in FIG. 5. FIG. 5A and FIG. 5B illustrates a boss and a compression protrusion, respectively, on each of two microanalysis devices inserted into matching sleeves or "depressions" in each of two other microanalysis devices. Other similar configurations can be used (see, Gonzalez et al. (1998) *Sensors and Actuators B* 49:40–43).

Optical alignment means: In contrast to using a physical component to provide alignment, first and second microanalysis devices can be aligned optically. For example, microanalysis devices having through-holes co-axially aligned with one another as shown in FIG. 6, can be aligned by moving a first microanalysis device with respect to a second microanalysis device such that the amount of light passing through the two coaxial holes is maximized. The shape of the through-holes can be round, square, triangular, rectangular, or the like.

Separate interconnect means

Figure 8A:
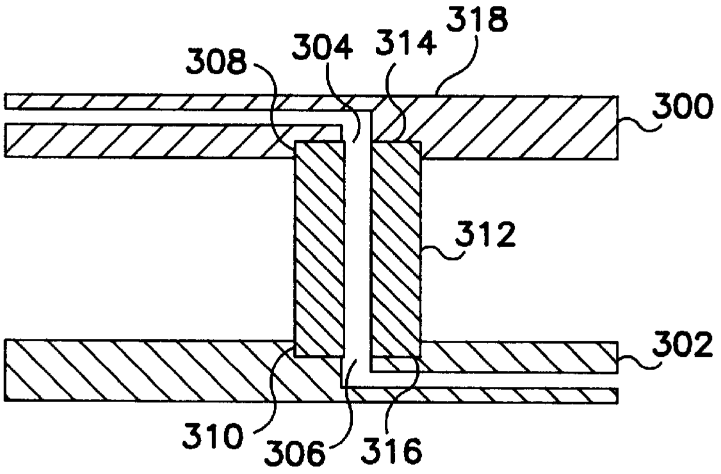
FIG. 8A and FIG. 8B are cross sections of examples of first and second microanalysis devices comprising a third fluidic path interposed between inlet and outlet ports of the two microanalysis devices.
Figure 8B:
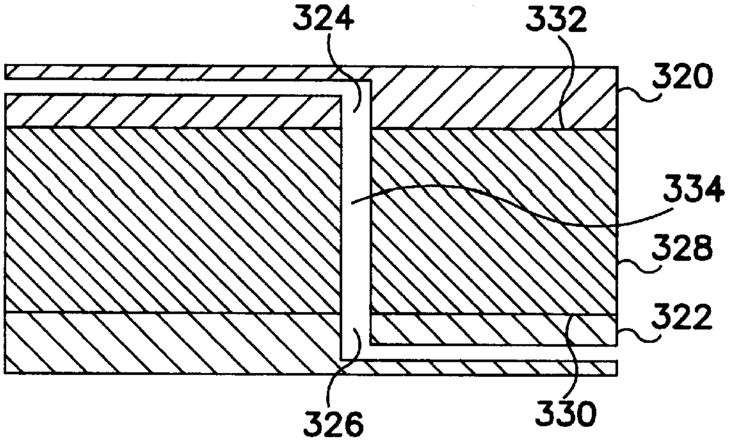

As used herein, "separate interconnect means" comprises a third fluidic path interposed between inlet and outlet ports of two microanalysis devices. One example of a separate interconnect means is illustrated in FIG. 8A. A first microanalysis device (300) having fluidic port (304) and sleeve (308) is interconnected to a second microanalysis device (302) having fluidic port (306) and sleeve (310) by interconnect means (312) having first and second opposing ends (314) and (316) and bore (318) extending therethrough. The dimensions of the interconnect means and the sleeves are such that fluid leakage is minimized. The interconnect means and the sleeves can be circular, square, triangular, or any shape that can be used to effect fluid-tight interconnection between the first and second microanalysis devices. Another example of a separate interconnect means is illustrated in FIG. 8B. First (320) and second (322) microanalysis devices having fluidic ports (324) and (326), respectively, are interconnected by a distinct planar device (328) having first (332) and second (330) opposing planar surfaces and a bore (334) extending therethrough. Planar device (328) acts as a thick compliant seal or boss.

A microanalysis device as disclosed and claimed herein can be used as a master for preparing duplicate structures containing the features thereof. Thus, for example, the substrate may be used as a master mold from which a duplicate may be made. Alternatively, the substrate may be used as a stamp or as any other means well known in the art by which a duplicate may be made.

Thus, the invention provides a novel microanalytical device and a novel microanalytical device system, each of which is capable of parallel sample processing on a micro scale. Although preferred embodiments of the subject invention have been described in some detail, it is understood that obvious variations can be made without departing from the spirit and the scope of the invention as defined by the appended claims.

We claim:

1. A device for use in microanalysis, comprising a substrate having:

(a) first and second substantially planar opposing surfaces; and (b) a plurality of microfabricated parallel sample processing compartments each comprising (i) a sample treatment component, (ii) an inlet port in fluid communication with the sample treatment component, and (iii) an outlet port in fluid communication with the sample treatment component.

2. The device of claim 1, wherein the inlet and outlet ports are in the first and second opposing surfaces, respectively, of the substrate.

3. The microanalysis device of claim 1, wherein the inlet port, the outlet port, or both the inlet and outlet ports are in a lateral surface of the substrate.

4. The device of claim 1, wherein the sample processing compartment further comprises a sample flow component.

5. The device of claim 1, wherein at least one sample processing compartment further comprises a sample flow component in serial arrangement with the sample treatment component.

6. The device of claim 5, wherein the serial arrangement of the sample flow component and the sample treatment component is alternating.

7. The device of claim 1, wherein the inlet port or the outlet port enable inter-microanalysis device fluid communication.

8. The device of claim 7, wherein the inlet port and the outlet port enable inter-microanalysis device fluid communication.

9. The device of claim 1, wherein each of the sample treatment components performs the same function.

10. The device of claim 9, wherein each of the sample treatment components comprise the same element.

11. The device of claim 9, wherein each of the sample treatment components comprises a different element.

12. The microanalysis device of claim 1, wherein each of the sample treatment components performs a different function.

13. The device of claim 1, wherein the outlet port is in fluid communication with a sample detection means.

14. The microanalysis device of claim 13, wherein the outlet port is in fluid communication with an off-device sample detection means.

15. The device of claim 13, wherein the outlet port is in fluid communication with an on-device sample detection means.

16. The microanalysis device of claim 1, wherein the outlet port is in fluid communication with a sample separation chamber.

17. The microanalysis device of claim 16, wherein the outlet port is in fluid communication with an off-device sample separation chamber.

18. The microanalysis device of claim 16, wherein the outlet port is in fluid communication with an on-device sample separation chamber.

* * * * *